(12) United States Patent
Sherwin (10) Patent No.: US 10,222,094 B2
(45) Date of Patent: Mar. 5, 2019

(54) SOLAR COOKING APPARATUS

(71) Applicants: Patrick Sherwin, Cincinnati, OH (US); Matthew Gillespie, Spring Valley, OH (US); Nathan Maggard, Terrace Park, OH (US)

(72) Inventor: Patrick Sherwin, Cincinnati, OH (US)

(*) Notice: Subject to any disclaimer, the term of this patent is extended or adjusted under 35 U.S.C. 154(b) by 81 days.

(21) Appl. No.: 15/131,177

(22) Filed: Apr. 18, 2016

(65) Prior Publication Data

US 2016/0305691 A1    Oct. 20, 2016

Related U.S. Application Data

(60) Provisional application No. 62/148,998, filed on Apr. 17, 2015.

(51) Int. Cl.
| | | |
|---|---|---|
| E04D 13/18 | (2018.01) | |
| F24S 20/30 | (2018.01) | |
| F24S 40/10 | (2018.01) | |
| F24S 23/74 | (2018.01) | |

(52) U.S. Cl.
CPC .............. *F24S 20/30* (2018.05); *F24S 23/74* (2018.05); *F24S 40/10* (2018.05); *Y02B 40/18* (2013.01); *Y02E 10/45* (2013.01)

(58) Field of Classification Search
USPC ............... 126/573–577, 600–603, 605–606, 126/681–682, 692, 694, 627, 624
See application file for complete search history.

(56) References Cited

U.S. PATENT DOCUMENTS

| | | | |
|---|---|---|---|
| 2,994,318 A | | 8/1961 | Lee |
| 4,002,499 A | | 1/1977 | Winston |
| 4,083,357 A | | 4/1978 | Fischer |
| 4,099,516 A | | 7/1978 | Caulier |
| 4,134,392 A | | 1/1979 | Livermore et al. |
| 4,203,427 A | * | 5/1980 | Way, Jr. .................. F24S 20/30 126/681 |
| D256,656 S | | 9/1980 | Naccach |
| 4,262,660 A | | 4/1981 | Ilich |
| 4,281,644 A | | 8/1981 | Chiles |
| 4,442,828 A | | 4/1984 | Takeuchi et al. |
| 4,494,528 A | * | 1/1985 | Horton .................... A01K 47/06 126/627 |
| 4,554,908 A | | 11/1985 | Hanlet et al. |
| 4,909,185 A | * | 3/1990 | Aldridge .................. C23C 8/10 118/729 |
| 5,676,128 A | | 10/1997 | Cowart |
| 5,950,618 A | | 9/1999 | Wu et al. |

(Continued)

*Primary Examiner* — Vivek Shirsat
(74) *Attorney, Agent, or Firm* — Larson IP, LLC (57) ABSTRACT

The present invention relates to a solar cooking apparatus, comprising: a first solar reflector; a second solar reflector; a solar collection element; and a solar collection element holder, wherein the first solar reflector and the second solar reflector are concave, and symmetrically arranged and aligned with a solar collection element axis, the reflectors having a up to a 360° range of motion around a plane perpendicular to the solar collection element axis, and focusing radiation at the solar collection element, which rapidly heats when the first and/or second solar reflectors are in an opened position, the first and second solar reflectors shield the solar collector when in a closed position. The solar cooking apparatus is adjustable and, in some embodiments, portable.

20 Claims, 11 Drawing Sheets

(56) References Cited

U.S. PATENT DOCUMENTS

| | | | | |
|---|---|---|---|---|
| 6,012,381 A | * | 1/2000 | Hawn | A47J 27/14 |
| | | | | 126/25 R |
| 6,023,810 A | | 2/2000 | Gessert | |
| 6,363,928 B1 | | 4/2002 | Anderson, Jr. | |
| 2010/0205963 A1 | * | 8/2010 | Ammar | F24J 2/055 |
| | | | | 60/641.15 |
| 2011/0023868 A1 | | 2/2011 | Seller | |
| 2012/0263845 A1 | | 10/2012 | Wang | |
| 2013/0022727 A1 | * | 1/2013 | Sherwin | F24J 2/02 |
| | | | | 426/523 |
| 2015/0208848 A1 | | 7/2015 | Huang et al. | |

* cited by examiner

SOLAR COOKING APPARATUS

CROSS REFERENCE TO RELATED APPLICATIONS

This application claims the benefit of priority from U.S. Provisional Application No. 62/148,998, filed Apr. 17, 2015.

BACKGROUND

In the outdoors, many modern conveniences are left behind. Backyard enthusiasts, tailgaters, and anybody in need of a portable heating source must plan accordingly, bringing equipment as well as a source of power or fuel. For example, conventional portable cookers can be electric, gas, or charcoal powered. While each variety is useful, electric grills require electric outlets, which seriously hinder their portability. Portable gas grills typically require compressed propane tanks, which come from a finite resource, can pose a fire hazard and are usually disposable thereby generating waste. Charcoal grills require charcoal briquettes, which are dirty, bulky, and are difficult and dangerous to dispose of after use. These grills are often bulky and take lengthy times to preheat, as well as cool down after use. Some of these drawbacks have been overcome by solar powered cookers.

Solar cookers are advantageous over conventional cookers because they are fueled solely by sunlight, without the use of traditional fuels. Moreover, solar cookers do not produce any smoke. Therefore, they do not contribute health-damaging pollutants or waste associated with cookers needing carbon-based fuels. Nevertheless, known solar cookers fail to work as intended because they need to be large, they are inefficient, and they are difficult to operate. For these reasons, no solar cooker has succeeded in achieving widespread use.

There are several recognizable solar cookers in the art. While, under desirable conditions, they all are capable of generating heat to cook, these cookers all have substantial shortcomings. For example, concentrating cookers are disadvantageous because they possess no means to minimize heat loss; they are large and awkward to operate; they reflect light at the operator and, therefore, require eye shielding to use; and they are messy, as drippings fall freely onto the reflector.

Box cookers are insulated. However, they can only achieve temperatures of about 300° F. because most of the heat escapes through a glass panel. These devices are typically bulky, heavy, slow to cook, and fragile.

The solar panel cooker is another example of a large and awkward apparatus. It is also disadvantageous because it takes a long time to generate low heat levels. The panel cooker is a variation of the above-mentioned concentrator. It follows that this cooker is inefficient because, like the concentrating cooker, it also lacks any means to store or trap heat energy.

There is a clear need to improve the concentration of solar energy to increase the thermal energy available to cook. Also, there is a need to retain that thermal energy by means of insulation. A disadvantage of a conventional parabolic reflector, such as the reflector described in U.S. Pat. No. 4,002,499, is that the solar energy is concentrated in a very small area, too small to be desirable for most cooking purposes. Moreover, the image area moves too quickly across the cooking container, unless the parabola is adjusted frequently. The present invention provides an improvement over known solar cookers by utilizing a non-imaging reflector that strikes a larger area relative to conventional parabolic reflectors, thereby increasing solar energy capture, and incorporating a non-tracking capability for ease of use. It remains that there are no known solar cookers that have the portability of conventional cookers and are able to generate sufficient heat to accomplish heating tasks, such as cooking, roasting, searing, baking, vaporizing, or frying, in a reasonable time. There is a need for an improved efficient working portable solar cooker.

The present invention shows superior performance in a wide range of heating applications such as: cooking, roasting, searing, baking, sterilizing, boiling, dehydrating, steeping, vaporizing, smoking, and frying.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The present invention is a practical and elegant design, which may incorporate the qualities of durability, mobility, and convenience into an apparatus that a consumer/user can easily operate and understand. Using principles of radiant energy reflection, absorption and insulation, the present invention provides a platform for solid performance and incomparable results within the solar cooking field.

The present invention is a solar cooking apparatus, which comprises at least a first solar reflector; a second solar reflector; a solar collection element; and a solar collection element holder, wherein the first solar reflector and the second solar reflector are concave, and symmetrically arranged and connected upon a first solar reflector hinge and a second solar reflector hinge that are both aligned with a solar collection element axis, each reflector having a range of motion on a plane perpendicular to the solar collection element axis, and focusing radiation at the solar collection element from a reflective surface when the first and/or second solar reflectors are in an opened position, the first and second solar reflectors protectively encase or shield the solar collector when in a closed position. The arrangements of features described herein allow the solar cooking apparatus to be adjustable relative to any horizontal plane.

The present invention can work whenever the sun is shining. The present invention can also cook without solar energy when equipped with an alternative energy source. Water can be heated and most foods can be prepared even on the coldest winter day. The apparatus described herein permits quick simple adjustment to maximize and focus solar collection. To this end, the solar cooking apparatus may comprise a solar collection element that can be a transparent evacuated vacuum tube, which has a tube-in-tube design. The inner tube can have layers comprised of aluminum-nitrile/stainless steel/copper coatings, which may be applied by spraying, etc. The inner tube may then be sealed under vacuum inside a clear outer tube. The vacuum provides insulation, which prevents heat from escaping or radiating from the inner tube. Therefore, the trapped heat cannot travel from the inner tube to the outer tube. Hence, even though the invention can achieve an internal temperature of about 700° F. (371° C.), under good lighting conditions, there is minimal risk of being burned by touching the outer tube. Finally, the tube can be shatter resistant. For example, the solar collection element may be coated with a shatter resistant coating and/or fitted inside a clear sheath for protection from external and internal forces (e.g., from thermal expansion/contraction, dropping).

Some embodiments of present invention may be used in the absence of a solar radiation source. These embodiments comprise at least a solar collection element used in combination with an alternative source of thermal energy. Such alternative energy sources include an electric heating element, such as an electro conductive heating element or a film heating elements, or a thermal battery, such as a molten salt battery.

Other objects and advantages will become apparent from reading the following detailed description of the invention in which reference is made to the accompanying drawings.

WRITTEN DESCRIPTION

Certain aspects of the invention described herein are also described in U.S. patent application Ser. No. 13/555,213 filed on Jul. 23, 2012, which is herein incorporated by reference in its entirety.

For purposes of the description hereinafter, spatial orientation terms, if used, shall relate to the referenced embodiment as it is oriented in the accompanying figures, or as otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

The following terminology is used herein to describe the relationship between the orientations of the solar cooking apparatus relative to the sun's rays. The sun's height above the horizon is called altitude. The solar cooking apparatus collect maximum solar energy when the sun's rays shine perpendicular (90°) to the open reflector plane. In order to create this perpendicular relationship, the user will adjust the tilt angle of the cooker. For example, if the sun is directly overhead (90° above the horizon) the solar cooker would be placed parallel to the earth's plane or horizontal plane and thus have a 0° tilt angle.

As used herein, "cooking" is construed as any heat driven application, which includes processes such as sterilization, vaporization, warming, heating, boiling, baking, pressure cooking, frying, steeping, dehydration, roasting, smoking, etc.

In addition to tilt angle (relating to the height of the sun in the sky), the solar cooker will have to be adjusted for azimuth which relates to the sun's apparent location east and west of true south (in the Northern Hemisphere). On the solar equinox, this azimuth angle changes over a 12 hour period, from 90° east of true south when the rises, to 90° west of true south when the sun sets.

Azimuth adjustments to the solar cooker can be performed via rotational movements whereby the user may physically move or shift the entire apparatus as it rotates towards the sun's hourly degree. Rotational angle adjustments will be described further below along with a more specific description of the mechanics.

Figure 1:
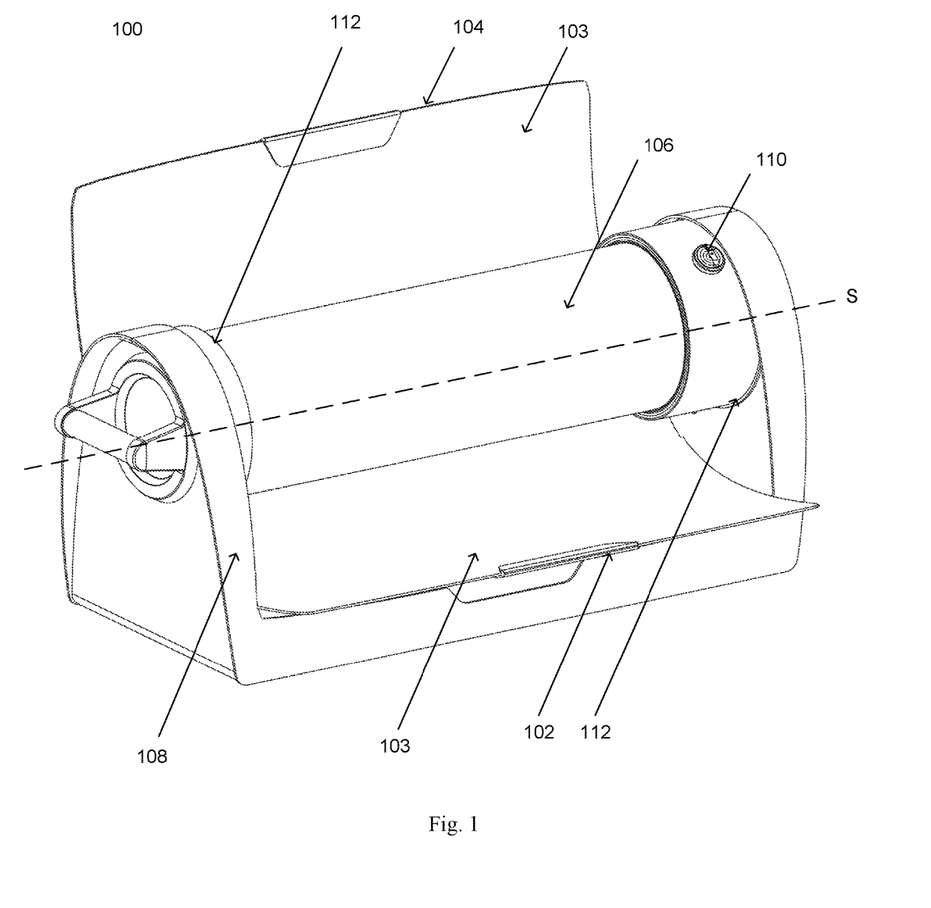
FIG. 1 is a perspective view of a solar cooking apparatus in an open position.
Figure 2:
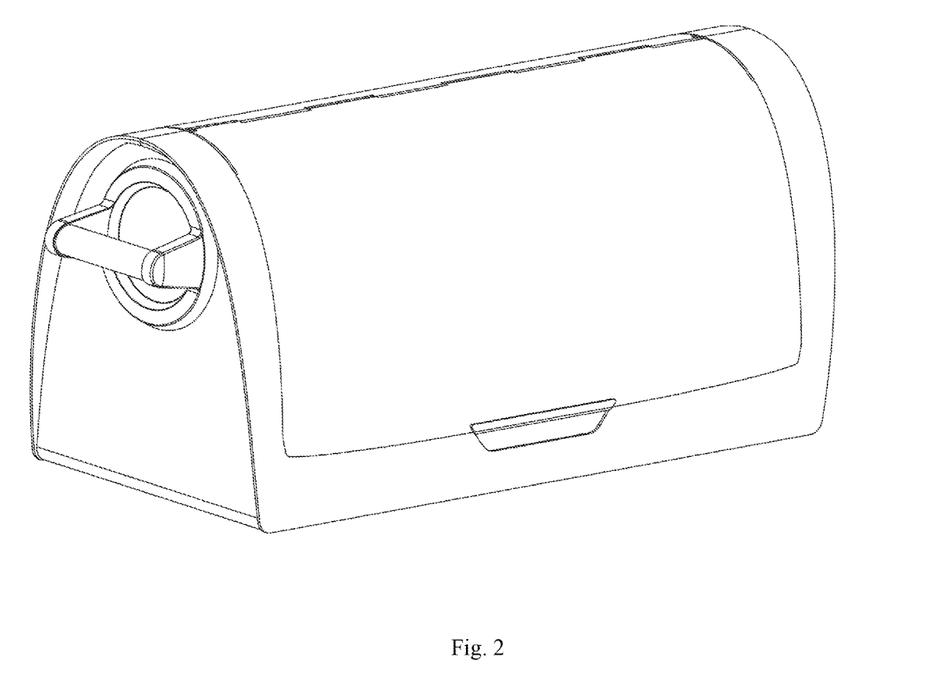
FIG. 2 is a perspective view of a solar cooking apparatus in a closed position.

Beginning with FIGS. 1 and 2, the solar cooking apparatus 100 may comprise a first solar reflector 102, a second solar reflector 104, each solar reflector having a reflective surface 103, and a solar collection element 106. The solar collection element 106 is supported in a solar collection element holder 108. The first solar reflector 102 and second solar reflector 104 can be rotated up to 360° around solar collection element 106 via a rotatable collar system 112, and reversibly fixed in place with a solar angle positioning device 110. The rotatable collar system 112 supports each end of the solar collection element 106 to connect it with the solar collection element holder 108.

Each of the first solar reflector 102 and second solar reflector 104 may have parabolic reflective surfaces 103, which are capable of focusing solar radiation. It is preferred that the reflective surfaces 103 be smooth, without irregularities or imperfections such as micro hills and valleys that cause deviations in reflected light. The concentration ratio of standard solar flux (defined at 1,000 W/m$^2$ at Standard Test Conditions) reflected onto the absorber (e.g., solar collection element 106) is best within a range of 2-6 times. Thus, the absorber is struck by 2-6 times more solar radiation than it would receive without the reflectors.

The reflectors (e.g. 102 and 104) used in the solar cooking apparatus have the advantage of not having to be adjusted so often for following the sun. The target (or solar collection element 106) may have a rounded surface to intercept the focused radiation from the outer rim of the reflector as well as from the bottom.

The reflectors herein may be short-focus parabolic reflectors. Since the parabolic reflector does not have a set radius, it must be discussed in general sizing terms in relationship to the diameter of an absorber (e.g. the absorptive layer of an outer layer of an inner tube of a solar collection element, as described below). For example, if a solar collection element (e.g., solar collection element 106) has a diameter of two inches and solar reflectors (e.g., first solar reflector 102 and second solar reflector 104) that are six inches in width, then there is solar concentration ratio of about three fold. In some embodiments, each of the first solar reflector 102 and second solar reflector 104 may have a solar reflector extending to further increase the solar concentration ratio.

The collector area or focus point is best in a range of 15-50% of the reflector's area. The collector (or solar cooking apparatus) is best with an absorptivity greater than 70%. The current model has an absorptivity above 90%. The re-radiation area is generally the same as the collector area and the emissivity is very close to zero. This low emissivity is due largely to the anti-reflective copper layer on the outside of the inner tube.

In one embodiment, first solar reflector 102 and second solar reflector 104 are each parabolic reflectors that are symmetrically arranged about the solar collection element 106. The parabolic reflectors each have a reflective surface 103 formed by any reflective material (e.g., anodized aluminum) or any other material capable of being formed into a parabolic shape and coated with a reflective layer. Representative reflective materials may include polished aluminum, stainless steel, chrome, mylar, silvered film, aluminized plastic film, metallic paint, etc.

Each of the first solar reflector 102 and second solar reflector 104 may be a parabolic reflector that may each be open at the axial ends. The solar reflectors each can articulate along up to 90° of angular rotation. The first solar reflector 102 and second solar reflector 104 may be rotated 360° about a solar collection element axis S. For instance, the solar reflector may be adjustable on a plane perpendicular to the solar collection element axis, and focusing radiation upon the solar collection element when the first and/or second solar reflectors are in an opened position, the first and second solar reflectors protectively encase, effectively shielding, the solar collector when in a closed position. These combinations of features have certain advantages over other solar cookers. For example, U.S. Pat. No. 5,676,128 shows dual reflectors and a solar collection element, which teaches the need for additional protective features for the solar collection element and concave solar reflectors, which are incapable of focusing the amount of energy required to sufficiently perform the applications of the present invention.

The solar collection element 106 may be an evacuated tube having a predetermined diameter in accordance with the desired cooking application (e.g. a small diameter solar collection element may be desirable for sterilization of instruments or for cooking small foods, while a large diameter solar collection element may be desirable for baking/roasting a small whole chicken). For example, the solar collection element may be a twin-glass tube, which consists of two glass tubes made from strong borosilicate glass. The outer tube is transparent allowing light rays to pass through with minimal reflection. The exterior of the inner tube forms an absorptive layer coated with a special selective coating (e.g., aluminum-nitrile/aluminum, aluminum-nitrile/stainless steel/copper coatings, borosilicate/aluminum/stainless steel/copper) which may comprise two or more layers, and features excellent solar radiation absorption and minimal reflection properties. The top of the two tubes are fused together and the air contained in the space between the two layers of glass is pumped out while exposing the tube to high temperatures. This "evacuation" of the gases forms a vacuum, which is an important factor in the performance of the evacuated tubes due to insulating properties. This arrangement of features permits the internal temperature of the inner tube 108 to achieve temperatures in excess of 400° F. (and in excess of about 700° F. under optimal solar conditions) while the outer tube of the solar collection element 106 remains safe and cool to the touch.

In order to maintain the vacuum between the outer and inner tubes, a barium getter can be used. During manufacturing of the evacuated tube this getter is exposed to high temperatures which cause the bottom of the evacuated tube to be coated with a pure layer of barium. This barium layer actively absorbs any $CO$, $CO_2$, $N_2$, $O2$, $H_2O$, and $H_2$ out-gassed from the evacuated tube during storage and operation, thus helping to maintaining the vacuum. The barium layer also provides a clear visual indicator of the vacuum status. The silver colored barium layer will turn white if the vacuum is ever lost. This makes it easy to determine whether or not a tube is in good condition.

The solar collection apparatus may also have a shatter-resistant feature that essentially encases the outer tube. This feature not only protects the glass tube from exterior shocks, it also protects the user in the unlikely event that the evacuated tube is broken (from impact or thermal shock). Representative embodiments of the shatter-resistant feature include a polymeric spray-on coating, tempered glass, an adhesive film, shrink coating, and/or a protective sleeve (plastic or glass), which the solar collecting element can be fitted into.

The solar collection apparatus may also have thermal shock resistance. For example, solar collection element 106 may comprise Vycor® glass (Corning, Inc.). In other embodiments the solar collection element 106 may comprise a stainless steel inner tube.

Figure 3:
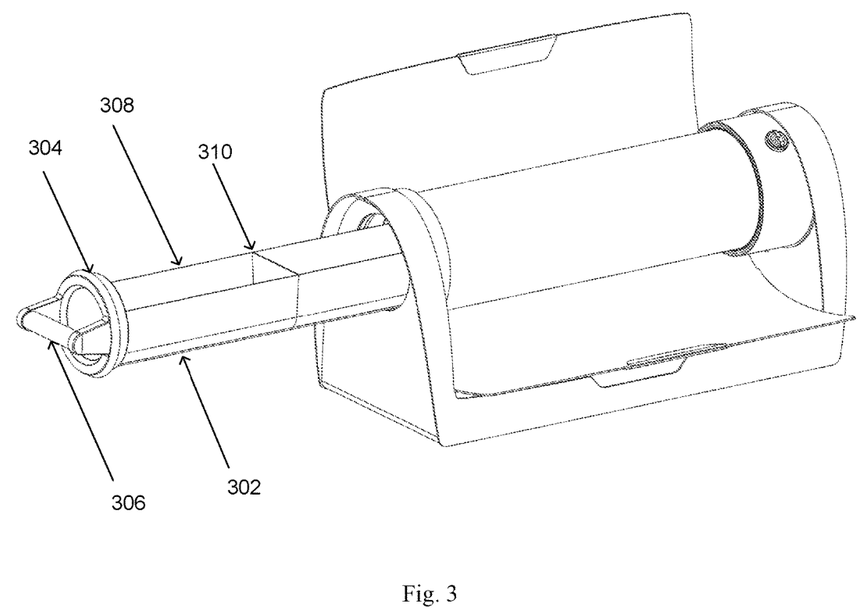
FIG. 3 is a perspective view of a solar cooking apparatus in an open position, showing a cooking tray.
Figure 4:
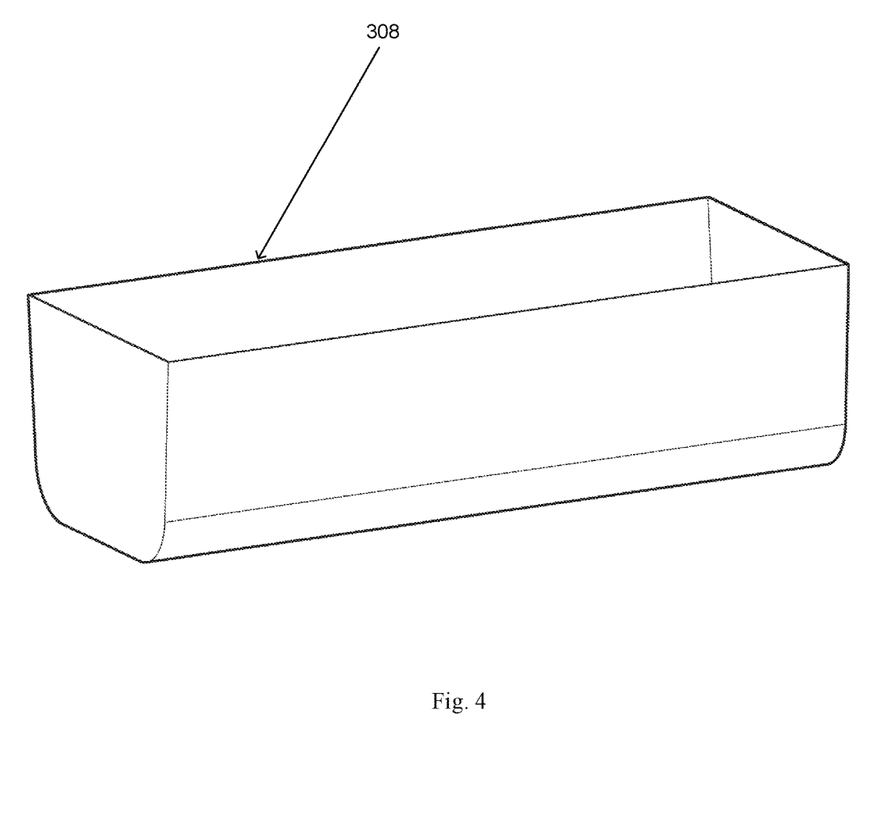
FIG. 4 is a perspective view of cooking container.

In FIG. 3, a solar cooking apparatus may have any of a cooking tray 302, which can slide in and out of solar collection element 106 on a rail system. The cooking tray 302 may be fashion with an insulated cap 304 and handle 306, a cooking container 308. The insulated cap 304 is optionally fitted with a ring shaped seal. The cooking container 308 may have a divider 310 to keep substances (e.g., food) separated while cooking.

Figure 5:
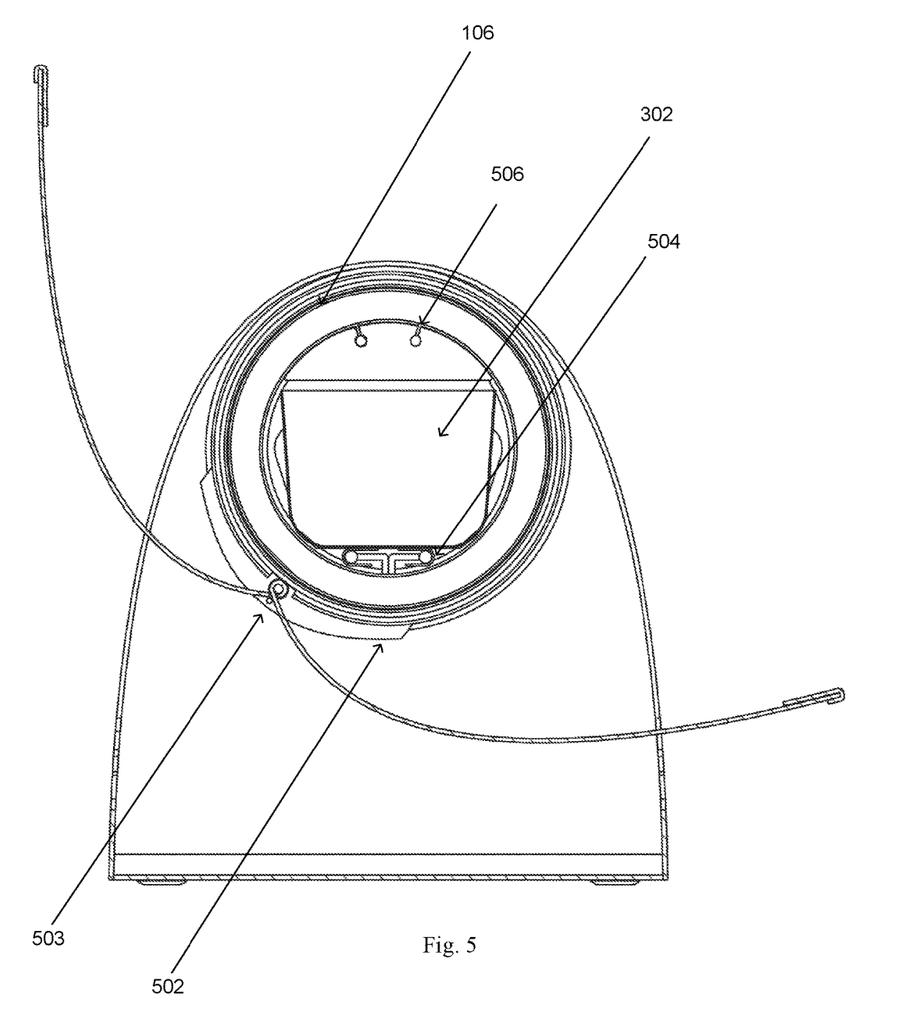
FIG. 5 is an end view of a solar cooking apparatus in an open position, showing a lighting element, and rail system.
Figure 6:
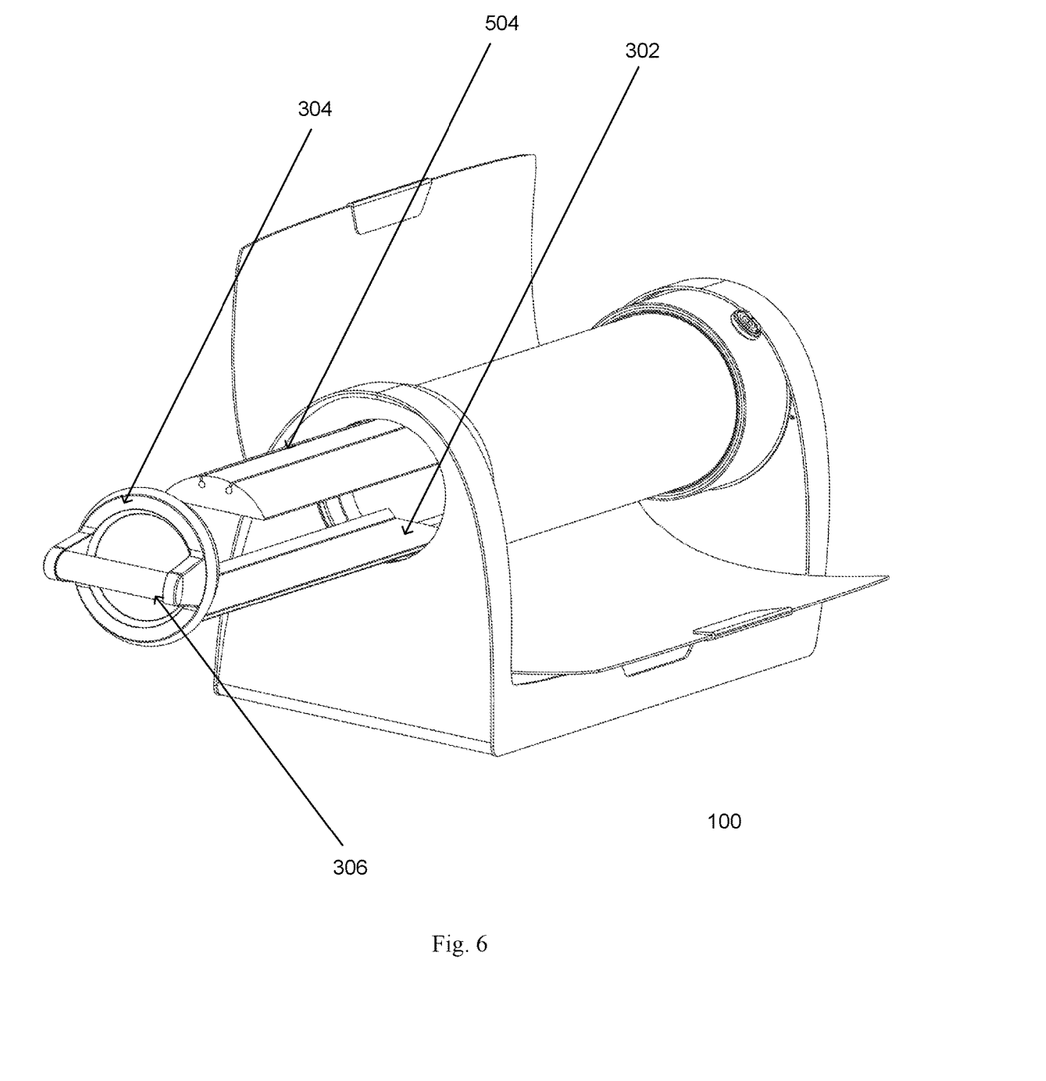
FIG. 6 is a perspective view of a solar cooking apparatus in an open position, showing a lighting element, cooking tray, insulated cap, and handle.

In FIG. 5, an optional hinge 502 may be one or more of any type of bearing that connects each of or both of the first solar reflector 102 and second solar reflector 104 to a solar cooking apparatus 100 (e.g., at a bracket or base frame, discussed below). The hinge 402 has a range of motion that accommodates moving each of the first solar reflector 102 and second solar reflector 104 between closed and open positions. Hinges may be made of flexible material or of rigid moving components. A hinge may first attach to each of or both of the first solar reflector 102 and second solar reflector 104 to position said reflectors in an optimal optic relationship to the solar collection device 106. The hinges permit movement of the solar reflectors for portability, protection and adjustments to maximize the solar concentration ratio. In some cases, the reflectors may not be attached to a hinge but instead place in a cradle or frame to create the necessary optics for optimal performance.

In one embodiment, the hinge 502 may be at least one continuous hinge (e.g., a piano hinge), wherein the hinge 502 attaches the solar reflectors to the solar cooking apparatus 100 at least one bracket 503. The bracket 503 provides attachable support for each of a solar collection element 106 and hinge 502. The cooking tray, optionally equipped with cooking container 302, can slide in and out of solar collection element 106 on a cooking tray having a rail system 504. A sliding lighting element 506 (e.g. a LED lighting element) can illuminate the contents of the cooking container 302 when the cooking tray in at least partially slid out from the solar collection element 106 (e.g. upon rail system 504).

The solar collection element holder of the invention (e.g., aforementioned a solar collection element holder 108) provide for both portability and stability of a solar cooking apparatus. However, it should be appreciated that a solar collection element holder may be alternatively fixed to any number of holding devices (e.g., stands) that are not required to be portable. In another embodiment of the invention, the solar cooking apparatus may be fixed to a yard post or pedestal. In other embodiments of the invention, the solar cooking apparatus may be fixed within a table stand, or to a swing arm attached to a boat or recreational vehicle.

Figure 7:
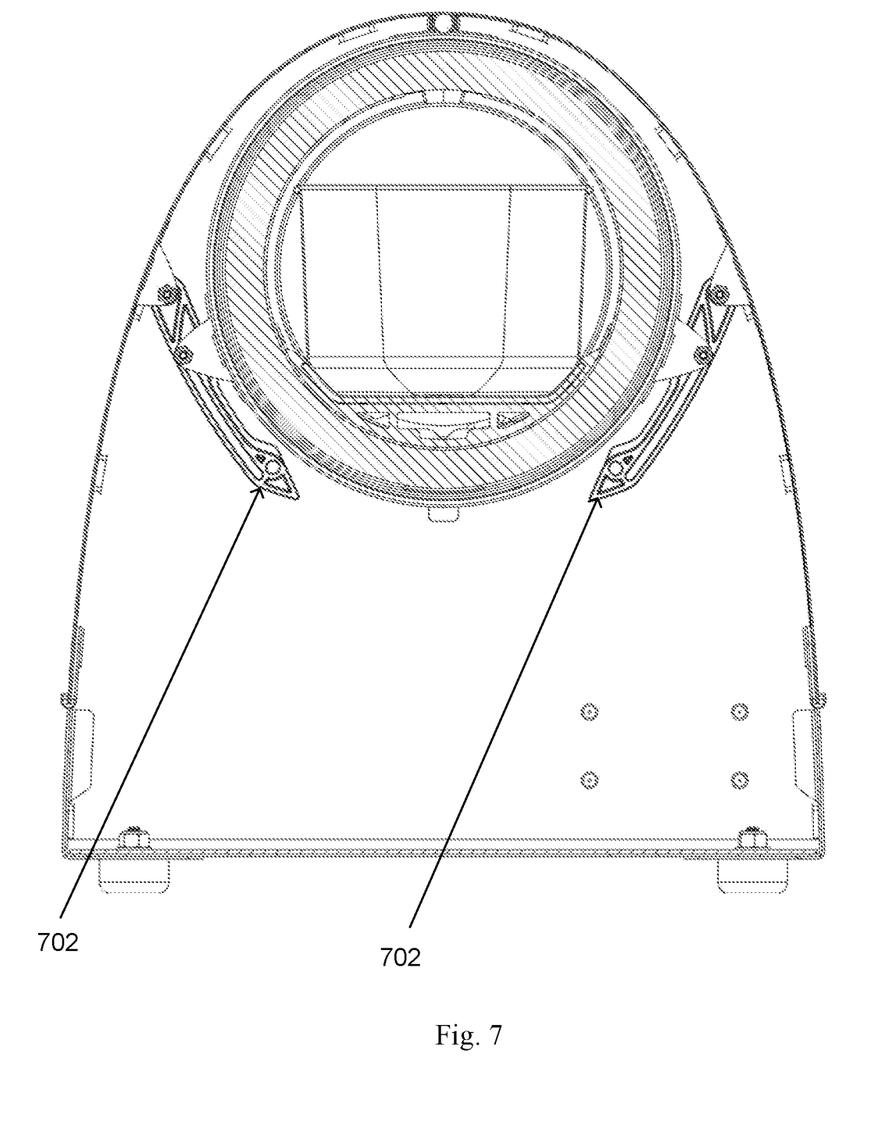
FIG. 7 is a cross-section end view of a solar cooking apparatus in a closed position, showing latch arms.
Figure 8:
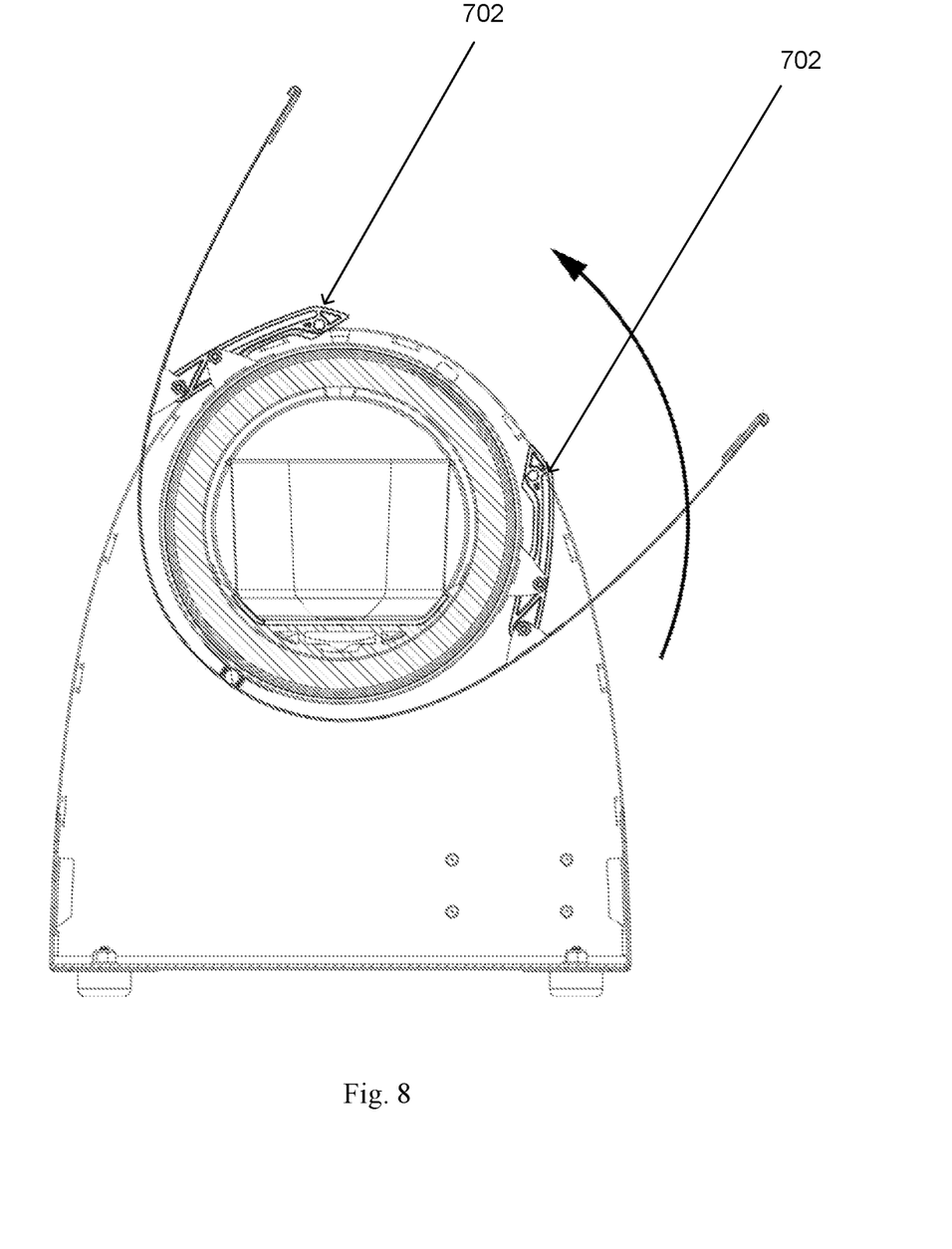
FIG. 8 is a cross-section end view of a solar cooking apparatus in a partially open position, showing latch arms.
Figure 9:
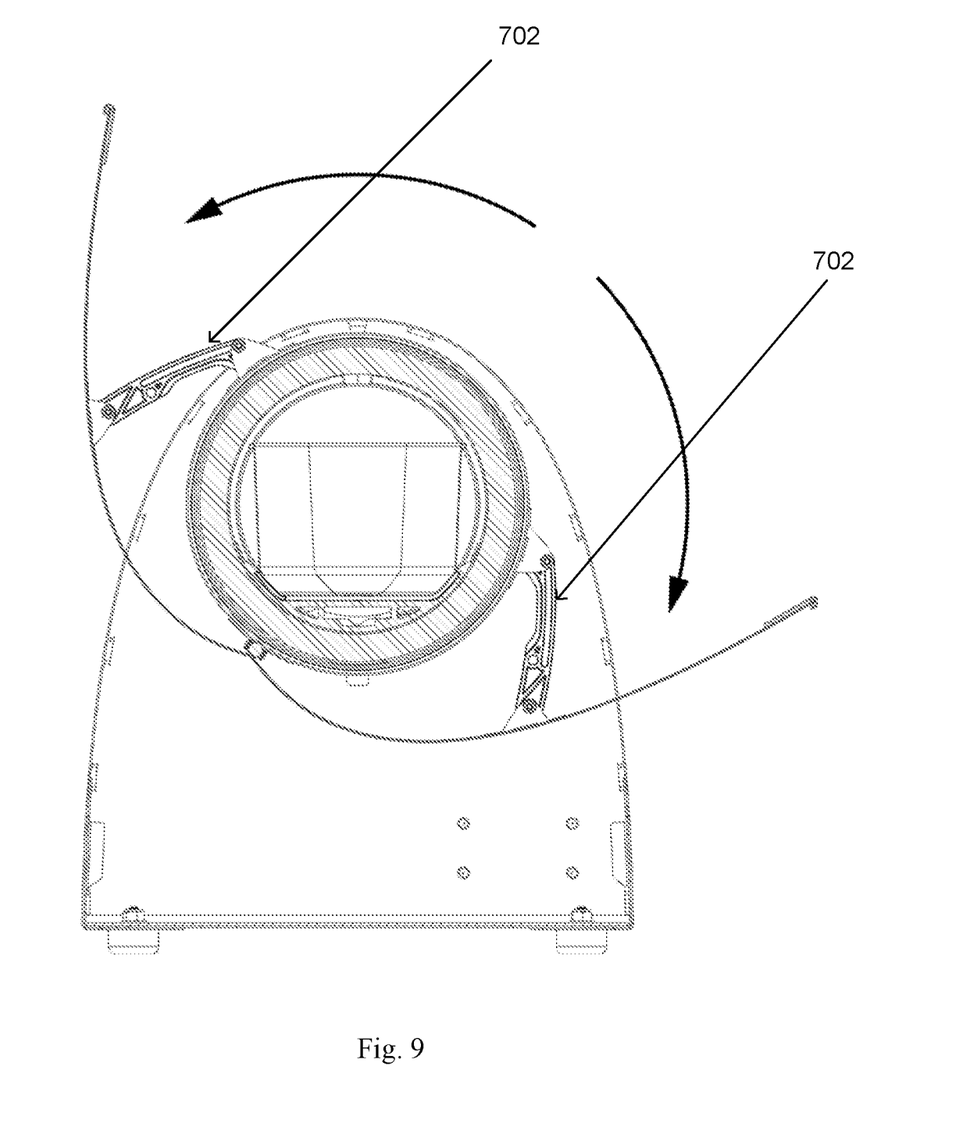
FIG. 9 is a cross-section end view of a solar cooking apparatus in an open position, showing latch arms.
Figure 10:
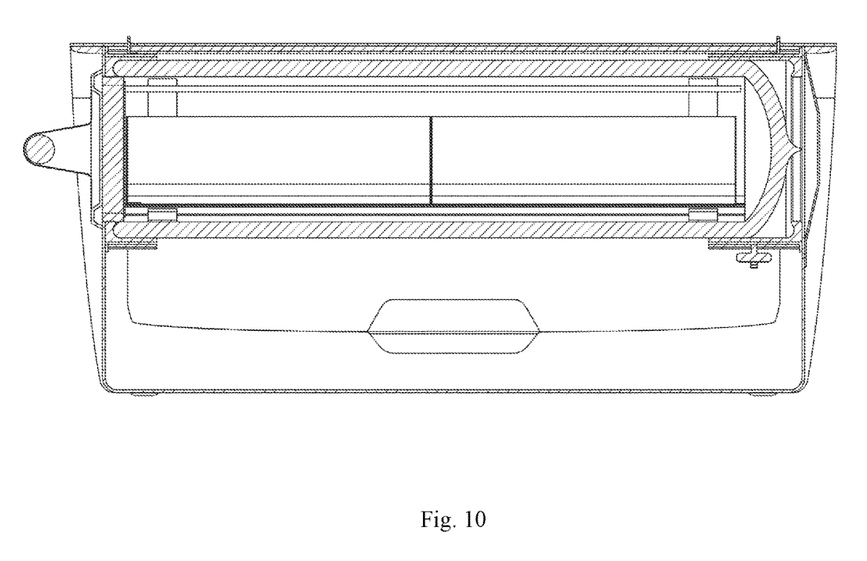
FIG. 10 is a cross-section side view of a solar cooking apparatus in a closed position, showing a lighting element, cooking tray, insulated cap, and handle.

In FIG. 7, one or more latch arms 702 connect each of the first solar reflector 102 and second solar reflector 104 to a rotatable collar system 112 of the solar cooking apparatus 100 (e.g., at a bracket or base frame, discussed below). The latch arms each have a range of motion that accommodates moving each of the first solar reflector 102 and second solar reflector 104 between closed and open positions. Latch arms 702 attach to each the first solar reflector 102 and second solar reflector 104 to position said reflectors in an optimal optic relationship to the solar collection device 106. The latch arms 702 permit movement of the solar reflectors for portability, protection and adjustments to maximize the solar concentration ratio. Such movement and positioning is shown in FIG. 8 and FIG. 9. Latch arms 702 can also have at least magnetic latch to secure the first reflector or the second reflector when in the closed position.

Figure 11:
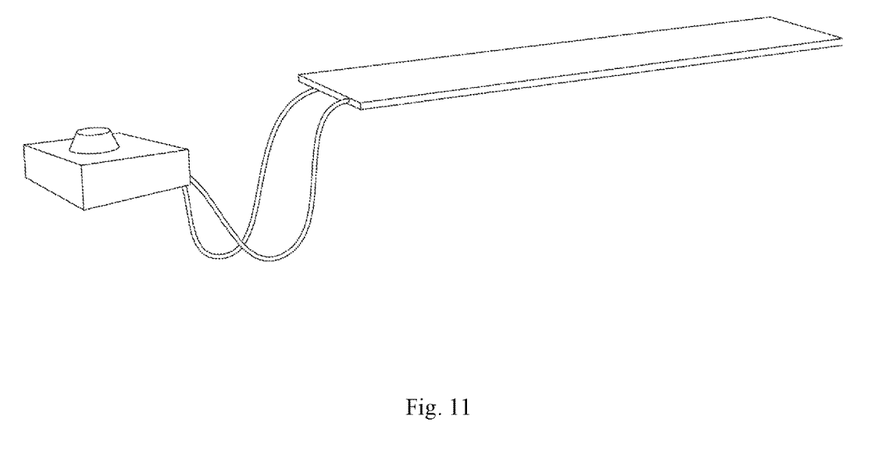
FIG. 11 is a perspective view of a heating element.

The solar cooking apparatus may also have an alternative energy source for cooking without a solar radiation source, or simply to improve cooking times and overall efficiency. In one embodiment, an electrical heating element 1100 (FIG. 11) is essentially a series of heat-conducting metal strip(s) (i.e. printed circuit board, resistance element, electro conductive heating element, or film heating elements, etc.) encased in a temperature-resistant material such as silicone. Electric wire(s) connect the strip(s) to an adjustment module, which regulates the amount of electricity that flows through the wire(s) and into the strip(s). When electricity runs through the metal strip(s), they release heat. The user may control the amount of electricity running through the strip(s) using the adjustment module, and therefore the temperature of the heating element. The adjustment module can have either an analogue or digital interface mounted on the outside solar cooking apparatus. When in use, the heating element fits within the inside of the solar collection element.

In other embodiments the alternative energy source may be a thermal battery, which can comprise a heat tolerant vessel (of aluminum, stainless steel, etc), encapsulating a phase-change material (or PCM; such as wax or salt having a melting point temp. range between 250° F. and 400° F.) to take advantage of the latent energy to absorb, hold and release heat more efficiently than relying on heat energy stored in material such as metal or stone. The thermal battery can be positioned inside the solar collection device but may also be removable (i.e. user wants to cook with direct sunlight during the day). The user can position the solar collection apparatus to collect solar radiation when a solar radiation source is available, thereby raising the temperature of the thermal battery and allowing the PCM to melt. Once the thermal battery's temperature is elevated, the user can insert and cook food inside the solar collection element using the heat stored inside the thermal battery, even in the absence of additional solar radiation.

It should also be appreciated that a solar collection element may have: a steam collection unit to divert and collect condensation from steam created in food/liquids heating inside of the solar collection element; the cooking tray and/or cooking container may have grip handles to assist in moving the cooking tray and/or cooking container; a solar dial to indicate the position of the reflectors relative to a solar energy source; and/or a sensor or probe such which can indicate the temperature inside of said solar collection element. The sensor or probe may remotely connect with a separate device, such as a mobile phone.

EXAMPLES

Example 1

The solar cooking apparatus in this example is tubular with 24" in length (61 cm), 1¾" (45 mm) inside diameter, 2¼" (57 mm) outer diameter surrounded by an anodized aluminum reflecting surface running the length of the tube which folds out to 8" in width. The 1 ¾" internal diameter is large enough to accommodate various meats, vegetables, and frozen finger-style foods while remaining highly portable. The entire apparatus has a dry weight of about three pounds (1.4 kg). It is capable of heating as much as 30 ounces (@ one liter) of fluid. Most fluids reach near boiling temperatures. About 4-8 ounces of fluids can be elevated to about 170° F. (77° C.) in a short time, depending on irradiance conditions (described in greater detail below).

Example 2

The example described below was conducted at GPS coordinates 35° 34'48"N 82° 33'21"W. The weather conditions were as follows: Relative Humidity 63%, Winds 1.2 MPH from variable, scattered clouds 4600 ft, Heat index 91° F., dew point 71° F., UV 9 out of 16, Rainfall 0.00 in, visibility 10.0 miles.

A Flux 62 MINI IR Thermometer—Infrared, point-and-shoot style thermometer was used to measure the internal temperature of a solar collection element.

A DayStar Solar Irradiance Meter was used to measure sunlight intensity/quality by using a solar PV cell and algorithm, output given in Watts per Square Meter only, Standard Test Conditions for Solar PV is set at full sun of 1,000 w/m². The irradiance meter was pointed in the direction of the sunlight.

At 9:37 AM the outside air temperature and temperature within the solar collection element were measured at 77° F. The solar cooking apparatus was removed from its carrying case, and unfolded into an open position. Subsequently, the solar cooking apparatus was oriented by tilting the solar cooking apparatus toward the rising sun in the east. The solar cooking apparatus was locked into position at a horizontal tilt angle of about 45° from vertical.

At 9:43 AM the internal temperature of the solar collection element was measured to be 194° F. As the solar cooking apparatus heated, the internal temperature of the solar collection element was measured to be continued to increase as shown in Table 1 below:

TABLE 1

| Time | Temperature | Irradiance |
| --- | --- | --- |
| 9:37AM | 77° F. | 850 w/m² |
| 9:43AM | 194° F. | |
| 9:45AM | 225° F. | 900 w/m² |
| 9:47AM | 268° F. | |
| 9:49AM | 304° F. | |
| 9:52AM | 363° F. | 950 w/m² |

Once the internal temperature of the solar collection element achieved an internal temperature of about 400° F., food (e.g., hot dogs) was placed into a trough style cooking implement. In this example, four scrambled eggs, chopped onions and some shredded cheese were placed in the cooking trough. The combination of ingredients were fully cooked at 30 minutes, having delicious taste and firm texture.

The invention claimed is:

1. A solar cooking apparatus, comprising:
   a first solar reflector;
   a second solar reflector;
   a solar collection element; and
   a solar collection element holder, wherein
   the first solar reflector and the second solar reflector are concave, and symmetrically arranged and aligned with a solar collection element axis, each reflector having a range of motion on a plane perpendicular to the solar collection element axis, and focusing radiation at the solar collection element from a reflective surface when the first and/or second solar reflectors are in an opened position toward a solar radiation source, the first and second solar reflectors shield the solar collector when in a closed position, and the solar collection element holder having a rotatable collar system attached to the solar collection element and first and second solar reflectors.

2. The solar cooking apparatus of claim 1, wherein the solar collection element is an evacuated tube-in-tube comprising:
   an inner tube having an inner tube diameter, an inner tube length, an inner tube open end, an inner tube closed end, an interior surface enclosing an interior space, and an exterior surface, the interior and exterior surfaces extending the inner tube length, wherein the exterior surface comprises an anti-reflection layer, an absorbance layer, and an infrared-reflection layer; and
   the outer tube having an outer tube diameter, an outer tube length, an outer tube open end, and an outer tube closed end, wherein the outer tube diameter and the outer tube length are both greater than the inner tube diameter and the inner tube length, wherein
   the inner tube is fixed inside of the outer tube and sealed between the inner tube open end and outer tube open end to form a hollow space extending the length of the exterior tube under vacuum pressure between the exterior wall of the inner tube and the outer tube.

3. The solar collection element of claim 2, comprising borosilicate glass or Vycor® glass.

4. The solar cooking apparatus of claim 1, the first reflector and the second reflector are connected upon at least one solar reflector hinge attached to the collar system.

5. The solar cooking apparatus of claim 1, the first reflector and the second reflector having up to 360° rotation around the solar collection element.

6. The solar cooking apparatus of claim 5, having a solar angle positioning device to reversibly fix the first reflector and the second reflector in an open position relative to solar collection element and solar radiation source.

7. The solar cooking apparatus of claim 1, the first reflector and the second reflector are each parabolic.

8. The solar cooking apparatus of claim 1 having a cooking tray being attached to an insulated handle cap capable of sealing the solar collection element.

9. The solar cooking apparatus of claim 8, having a rail system inside of the solar collection element capable of moving the cooking tray in and out of the solar collection element.

10. The solar cooking apparatus of claim 8, the cooking tray having at least one cooking container optionally fitted with a drip tray system.

11. The solar cooking apparatus of claim 2, wherein the solar collection element is enclosable with an insulated handle cap to form a seal between a cooking tray and the solar collection element.

12. The solar cooking apparatus of claim 1, wherein the first solar reflector and/or the second solar reflector are comprised of at least one of anodized aluminum, stainless steel, chrome, mylar, silver film, plastic film or metallic paint.

13. The solar cooking apparatus of claim 1, having an alternative energy source within the inside of the solar collection element.

14. The solar cooking apparatus of claim 13, wherein the alternative energy source is an electric heating element or a thermal battery.

15. The solar cooking apparatus of claim 1 having at least one sensor.

16. The solar cooking apparatus of claim 1 having a condensate collection system.

17. The solar cooking apparatus of claim 1 having a light source within the solar collection element.

18. The solar cooking apparatus of claim 1 being portable.

19. The solar cooking apparatus of claim 1, the first reflector and the second reflector are each connected to the collar system by at least one latch arm.

20. A solar cooking apparatus, comprising:
   a first solar reflector;
   a second solar reflector;
   a solar collection element; and
   a solar collection element holder, wherein
   the first solar reflector and the second solar reflector are concave, and symmetrically arranged and aligned with a solar collection element axis, each reflector having a range of motion on a plane perpendicular to the solar collection element axis, and focusing radiation at the solar collection element from a reflective surface when the first and/or second solar reflectors are in an opened position toward a solar radiation source, the first and second solar reflectors shield the solar collector when in a closed position, and the solar collection element holder having a rotatable collar system attached to the solar collection element and first and second solar reflectors upon one or more latch arms, the first reflector and the second reflector having up to 360° rotation around the solar collection element.

* * * * *